(12) United States Patent
Neal et al.

(10) Patent No.: US 10,945,406 B2
(45) Date of Patent: Mar. 16, 2021

(54) BOVINE TEAT WASHING AND LACTATION STIMULATION DEVICE

(71) Applicants: Jody J. Neal, Albion, NY (US); Jayden H. Neal, Albion, NY (US); Zachary R. Neal, Albion, NY (US)

(72) Inventors: Jody J. Neal, Albion, NY (US); Jayden H. Neal, Albion, NY (US); Zachary R. Neal, Albion, NY (US)

( * ) Notice: Subject to any disclaimer, the term of this patent is extended or adjusted under 35 U.S.C. 154(b) by 416 days.

(21) Appl. No.: 15/921,190

(22) Filed: Mar. 14, 2018

(65) Prior Publication Data
US 2019/0281784 A1    Sep. 19, 2019

(51) Int. Cl.
*A01J 7/04*    (2006.01)
*A01J 5/00*    (2006.01)

(52) U.S. Cl.
CPC .. *A01J 7/04* (2013.01); *A01J 5/00* (2013.01)

(58) Field of Classification Search
CPC ........ A01J 5/00; A01J 7/00; A01J 7/02; A01J 7/025; A01J 7/04
USPC .......... 119/14.18, 14.46, 14.47, 14.49, 14.51
See application file for complete search history.

(56) References Cited

U.S. PATENT DOCUMENTS

| | | | |
|---|---|---|---|
| 2,532,088 A | 11/1950 | Cordis | |
| 3,713,423 A | 1/1973 | Sparr, Sr. | |
| 4,305,346 A | 12/1981 | Sparr, Sr. | |
| 6,302,058 B1 * | 10/2001 | Dahl | A01J 7/04 |
| | | | 119/14.47 |
| 6,308,656 B1 | 10/2001 | Milbrath et al. | |
| 6,321,682 B1 | 11/2001 | Eriksson et al. | |
| 6,557,488 B1 * | 5/2003 | Schuster | A01J 5/08 |
| | | | 119/14.49 |
| 6,591,784 B1 | 7/2003 | Eriksson et al. | |
| 6,752,102 B2 * | 6/2004 | Dahl | A01J 7/04 |
| | | | 119/14.47 |

(Continued)

FOREIGN PATENT DOCUMENTS

EP    0801893 A2    10/1997

OTHER PUBLICATIONS

Written Opinion in PCT Appl. No. US2019/021813. EFS File Name: 20190731_15-921190_IDS_NPL_Cite1.

(Continued)

*Primary Examiner* — David J Parsley
*Assistant Examiner* — Danielle A Clerkley
(74) *Attorney, Agent, or Firm* — John M. Hammond; Patent Innovations LLC

(57) ABSTRACT

A teat treatment apparatus comprising a tubular outer housing containing a tubular inner shell. The tubular inner shell includes a side wall defining a teat treatment cavity, including a central side wall portion. An inlet port extends through a side wall of the tubular outer housing and is in fluid communication with an annular cavity formed by the inner side surface of the tubular housing and an upper annular ridge, recessed central side surface, and lower annular ridge of the side wall of the tubular inner shell. Orifices are provided in the central side wall portion of the tubular inner shell. Each of the orifices is in fluid communication with the annular cavity and the treatment cavity, and each of the orifices defines an orifice axis directed at an oblique angle with respect to the central axis of the treatment cavity and downwardly with respect to the treatment cavity plane.

20 Claims, 7 Drawing Sheets

(56) References Cited

U.S. PATENT DOCUMENTS

| | | | |
|---|---|---|---|
| 8,555,811 B2 | 10/2013 | Dole | |
| 2002/0185071 A1* | 12/2002 | Guo | A01J 7/04 |
| | | | 119/14.47 |
| 2004/0231603 A1* | 11/2004 | Bjork | A01J 7/04 |
| | | | 119/14.18 |
| 2004/0234557 A1 | 11/2004 | Edison et al. | |
| 2008/0072824 A1* | 3/2008 | Mostert | A01J 7/025 |
| | | | 119/14.02 |
| 2015/0334979 A1 | 11/2015 | Roytek | |
| 2017/0223920 A1 | 8/2017 | Godfrey et al. | |

OTHER PUBLICATIONS

US Food and Drug Administration memorandum M-I-07-5 (Supplement 1), "Subject: Teat Preparation 2006 and 2007 DeLaval VMS (tm)," May 12, 2015. EFS File Name: 20180511_15-921190_IDS_NPL_Cite1.

US Food and Drug Administration memorandum M-I-16-8, "Subject: Teat Preparation Protocol BouMatic Robotics MR-S1 and MR-D1 Milking Robots," Jun. 14, 2016. EFS File Name: 20180511_15-921190_IDS_NPL_Cite2.

* cited by examiner

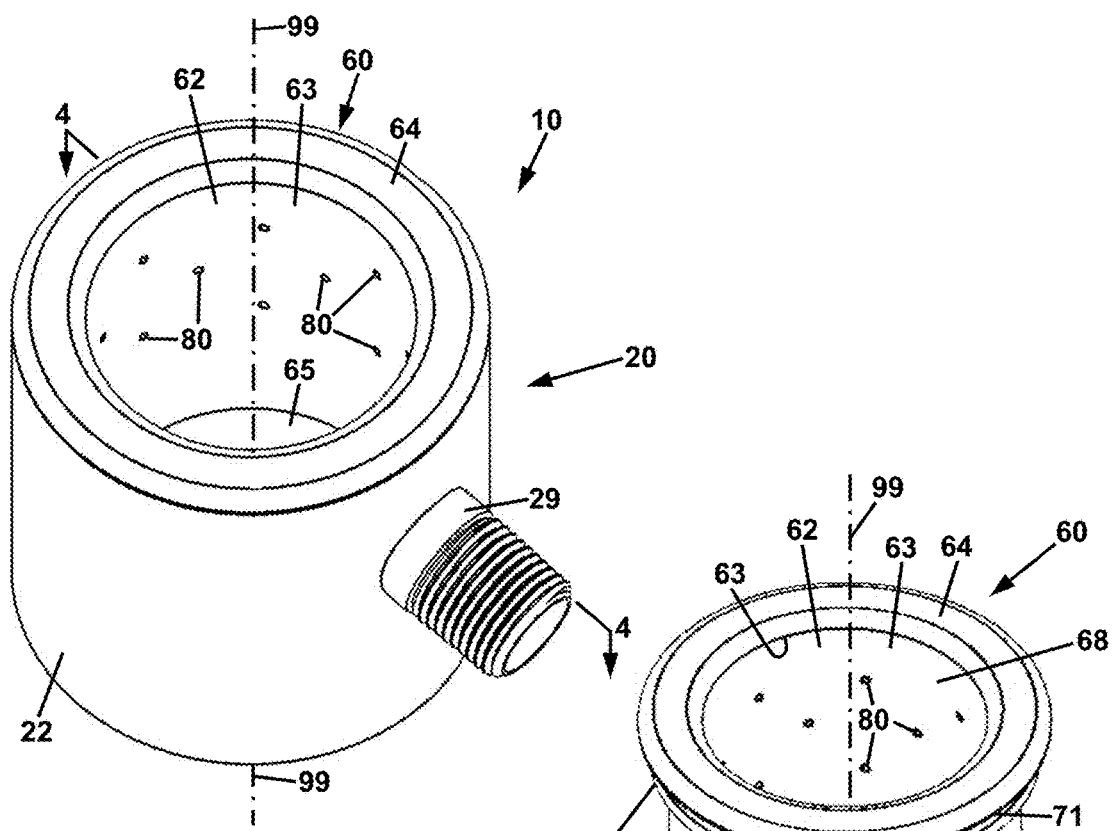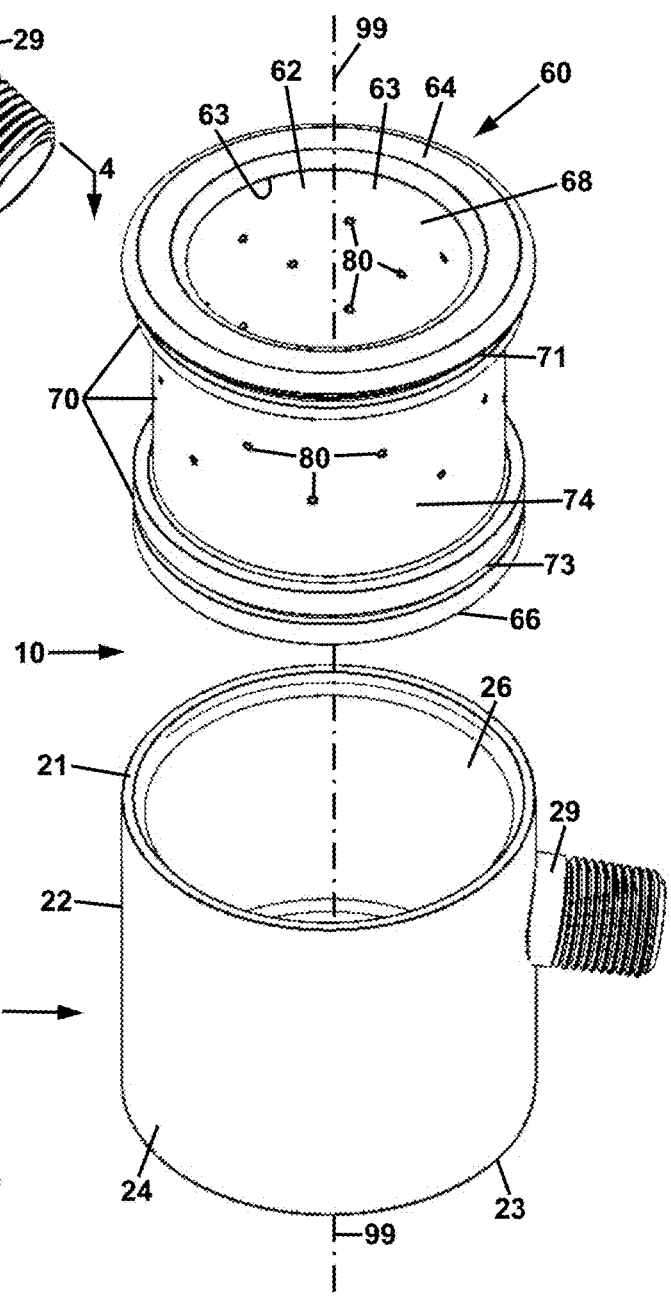
FIG. 2
FIG. 3

US 10,945,406 B2

BOVINE TEAT WASHING AND LACTATION STIMULATION DEVICE

BACKGROUND

Technical Field

Milk production, and in particular, the harvesting of milk from dairy cattle and other mammals.

Description of Related Art

The dairy industry has undergone major changes in recent years. The vast majority of milk that is obtained from dairy cattle is produced by dairy farms that milk five hundred or more cows. A modern dairy farm is a "milk manufacturing plant," functioning as the furthest upstream operation in the production of milk for direct consumption and for further processing and use in foodstuffs.

Like virtually all large scale manufacturing operations, modern dairy farms have adapted new technologies in order to produce milk in high volumes, and at the lowest possible costs. Computer algorithms and computer process control is used to automate the feeding of dairy cattle, monitor the health of cows, and track the milk production of each cow in a herd, with the objective of maximizing milk production per dollar spent from each cow.

Progress is being made in the automation of the milking process itself by the use of robotics. However, the problems are challenging because the geometry of a bovine udder varies widely from cow to cow. Accordingly, highly intelligent machine vision and robotic arm articulation capabilities are needed in any automated system, in order to properly attach a milking machine to any given cow. At this time, attachment and removal of milking machines to a cow's teats are done manually by humans in most dairy operations, although full automation of these tasks will likely occur in the future.

In the milking of a cow, certain pre-milking steps are also required regardless of whether they are done manually by a human, or using automated robotic equipment. In one step, the teats of the cow must be sanitized so that contaminants on the teats do not contaminate the milk being extracted from the cow. Given that dairy cows spend a great deal of time lying around barns and pastures, it is very common for the udders of cows to accumulate manure, both dry and caked on, and fresh. This manure contains *E coli* and other bacteria that must be prevented from contaminating the milk. Thus prior to attachment of a milking machine to the cow's teats, any accumulated manure, soil, and other contaminants on the surfaces that are subsequently enclosed by the teat cups of the milking machine must be removed, or treated with disinfectant so that all pathogens on these surfaces are killed and cannot grow in the extracted and stored milk. In any dairy operation, in accordance with public health laws, a standardized bacteria count of milk, known as bacteria plate count, is constantly monitored. A high bacterial plate count indicates poor sanitation practices. If the bacterial plate count of milk exceeds a given acceptance threshold, the milk cannot be shipped to a processing plant, and must be discarded. Subsequently, milk cannot be shipped until a low bacteria plate count is restored. Thus a bacteria plate count violation due to poor sanitation practices is very costly.

Additionally, if the teats of a cow are not adequately sanitized, pathogenic bacteria, such as *Staphylococcus aureus,* may be introduced into one or more of the cow's teats, resulting in an infection and inflammation of the teats and udder tissue, known as mastitis. Another standard test, known as somatic cell count, is performed on milk. A high somatic cell count in milk is indicative of poor animal health. Again, if somatic cell count exceeds a given acceptance threshold, the milk must be discarded. Thus a somatic cell count violation due to mastitis, which may be due to poor sanitation practices, is very costly.

Antibiotics may be administered to treat mastitis. However, when a cow receives antibiotics, her milk must be discarded for a mandatory withdrawal period until the antibiotics have cleared the cow's system. This is required in order to ensure that no antibiotics contaminate the milk upstream of processing for retail sale and use in foodstuffs. Thus the occurrence of mastitis is very costly with respect to milk loss and medication costs.

In another pre-milking step, a cow must be "started," i.e., stimulated in a manner that causes the cow to "let down" her milk. Such stimulation may be similar to the stimulation of a calf suckling. When the teats and udder are properly stimulated, oxytocin is released from the pituitary gland causing myoepithelial cells in the udder to contract moving milk to the ducts and cistern above the teats. The duration of this effect is time limited, so attachment of the milking machine, or "milking unit," to the teats at the proper time allows the most efficient harvest of milk. The release of oxytocin can include stimuli such as auditory and visual signals in addition to direct contact to teats and udders.

Milking protocols should maximize the normal milk let down prior to harvest in order to avoid negative effects of unit attachment during limited or low milk flow. Not following proper protocols can cause injury to the teat and has a higher risk of air introduction into the milking unit. This air introduction can create turbulence and aerosols, thereby increasing the risk of infection and mastitis previously described. Milking unit detachment should occur when milk harvest has removed the optimal amount of milk. Residual amounts of milk present in the udder can be quantified and monitored as part of the quality control process to optimize milk harvest.

The publication, "*Dairy NZ Milksmart,* "Milk Let Down" of Dairy NZ Limited, November 2012, published online at www.dairynz.co.nz/media/214384/Milk-let-down.pdf, discloses, "The milk let down reflex stimulates milk flow from the alveoli in the udder into the teat canal. It has to occur before a cow will milk out freely. A cow which has 'let down' prior to cup attachment will milk out faster, and in many cases, more completely, as long as the let down does not occur too long before cup attachment as this can slow the milking process. The let down reflex can be inhibited resulting in slow or interrupted milking of cows."

Additionally, this publication discloses that, "Cows that let down just prior to cup attachment will milk out more completely thus maximising production . . . . Oxytocin stimulates contraction of myoepithelial cells, causing milk to be ejected into the ducts and cisterns above the teat. Oxytocin is released after the cow receives an appropriate stimulus, this can be visual, aural or physical, and should be predictable and consistent at every milking. Handling/massage of the teats for at least 15 seconds is a strong stimulus, but cows can also learn to let down through the association of the dairy environment to the milking process . . . . The action of oxytocin is essential for emptying of the udder during milking. As much as 80% of a cow's milk is unavailable if this oxytocin release is insufficient or does not occur. Its let down action lasts for about 5 minutes and is strongest for the first 3 minutes of milking. It is important to get the cups attached quickly after let down has started to make full use of the increased udder pressure that occurs."

This document further notes that, "Slow milking time and incomplete milking out are indicators of interrupted milk let down. Agitated, fearful or stressed cows produce the hormone adrenaline which counteracts the activity of oxytocin and inhibits let down. Pain during the milking process will affect milk let down. Ensure any udder conditions are treated and milking machinery is not hurting cows." Indicators of milk letdown problems are described as follows: "There is no milk flow when the [milking machine] cluster has been attached for greater than 2 minutes in late lactation, sooner in early lactation;" and "The milk flow is ending when there is still a significant amount of milk in the udder. The flow can be interrupted part way through milking. In this case the milk flow at the start of milking is residual milk left in the cistern from the end of the previous milking and not milk which has been let down at this milking." Cows that retain residual milk due to poor letdown may be more prone to mastitis, with the associated adverse consequences described above, and can also experience a prolonged decrease in milk production.

In a manual milking operation, the let down of milk is typically induced by the dairy worker's handling/massage of the teats. Improper technique, timing, or duration of the massaging of the teats will cause inadequate or interrupted milk let down and associated problems, as noted in the above-cited document. It is noted that the "handling/massaging" of a cows teats is not simply unstructured kneading them as if they were rolls of dough. Instead, the dairy worker must grasp a teat proximate to the cow's udder, and progress in a tugging motion downwardly sliding his gently maintained grip along the teat to its distal end, thereby causing milk to be ejected from the lumen of the teat. This procedure is repeated several times on each of the four teats. It will be apparent that this procedure requires work experience and an instinctive sense of tactile "feel" of the teat by the dairy worker.

It will also be apparent that such an operation will be exceedingly difficult to perform in an automated manner with a robotic device. Even if machine vision and robotic articulation capabilities advance so as to enable the fitting of a milking machine to a cow's teats in an automated manner, the robotic simulation of a human hand to perform the pre-milking step of stimulating letdown of milk in a cow with the precision required to obtain optimum milk production and good health remains to be accomplished.

It is further noted that on one hand, it is preferable to sanitize a cows teats prior to massaging them to induce milk let down. In that manner, the dairy worker is massaging clean teats free of any manure and other contaminants. On the other hand, the dairy workers hands are in most cases not sanitary, and thus the act of massaging the teats re-contaminates then with whatever pathogens may be present on his hands.

One method that is practiced in many dairy operations is to dip the teats in a small cup of sanitizer (such as an iodine solution), then massage the teats to stimulate let down, and then dip them in the sanitizer again. However, this procedure is time consuming, error prone, and often still does not achieve the desired sanitation effect. There is also a risk of residual sanitizing solution on the teats contaminating the milk taken from the cow.

Mechanical teat sanitizing devices are known. Some devices are complex, with moving parts such as drive belts and brushes that mechanically scrub the teats. These devices are expensive, complex, require high maintenance, are relatively heavy for the dairy worker (when used repeatedly hundreds or thousands of times during a milking shift), and may abrade and injure the cow's teats with repeated use 2-3 times per day. Additionally, it remains preferable to practice the sanitize-stimulate-sanitize cycle with these devices, so no advantage is gained in cycle time by using them.

Thus there remains a need for a simple teat washing device that is effective in rapidly sanitizing cows' teats, while being light in weight and easy to use. There is also a need for a device that can stimulate let down of milk in a cow's udder so that the massaging of the cow's teats by the dairy worker is not needed. There is an even greater need for a device that can simultaneously perform teat sanitization, stimulation of milk letdown, and drying of teats all in one single operation, so that in a single pre-milking step, the cow's teats are completely prepared to receive the cups of the milking machine, whether engaged by manual operation or by a robotic system.

SUMMARY

The present invention meets this need by providing a teat treatment apparatus that has the dual capability of perform teat sanitization and stimulating milk letdown in a single operation. The teat treatment apparatus is comprised of a teat enclosure assembly including an outer housing surrounding a tubular inner shell having a teat treatment cavity. In operation of the teat treatment apparatus, liquid disinfectant is injected through orifices in the tubular inner shell and onto the teat. Each orifice is oriented downwardly and laterally with respect to the teat, such that liquid jets impinge on the teat at a downward and lateral angle with respect to the teat. The Applicants have discovered that liquid jet flow impinging on the teat at downward and lateral angles are not only effective at washing and disinfecting the teat, but surprisingly, this jet flow causes a circular motion of the distal end of the teat, which stimulates let down of milk in the udder.

More particularly, in accordance with the present disclosure, a teat treatment apparatus is provided, which comprises a tubular outer housing containing a tubular inner shell. The tubular outer housing is comprised of a side wall bounded by top and bottom edges, an outer side surface, and an opposed inner side surface. The tubular inner shell is comprised of a side wall defining a treatment cavity having an open top for receiving a teat of an udder, an open bottom, and a central axis extending through the open top and open bottom. The side wall of the inner shell is bounded by an upper edge defining the open top and a treatment cavity plane orthogonal to the central axis, a lower edge defining the open bottom, an inner side surface, and an opposed outer side surface including an upper annular ridge contiguous with the inner side surface of the side wall of the tubular outer housing proximate to the top edge, a recessed central outer side surface contiguous with a central side wall portion of the tubular inner shell, and a lower annular ridge contiguous with the inner side surface of the side wall of the tubular outer housing proximate to the bottom edge. An inlet port extends through the side wall of the tubular outer housing and is in fluid communication with an annular cavity formed by the inner side surface of the tubular housing and the upper annular ridge, recessed central side surface, and lower annular ridge of the side wall of the tubular inner shell. A plurality of orifices is provided in the central side wall portion of the tubular inner shell. Each of the orifices is in fluid communication with the annular cavity and the treatment cavity, and each of the orifices defines an orifice axis directed at an oblique angle with respect to the central axis of the treatment cavity and downwardly with respect to the treatment cavity plane.

In certain embodiments, the tubular outer housing may be a cylindrical housing and the tubular inner shell may be a cylindrical shell surrounding the central axis of the treatment cavity. The plurality of orifices may be arranged in a plurality of rows at successive planar locations parallel to the treatment cavity plane. The plurality of orifices may be provided in an upper region of the central side wall portion of the tubular inner shell, with a lower region of the central side wall portion being a continuous side wall region. The apparatus may be further comprised of an upper seal disposed between the inner side surface of the tubular outer housing and the upper annular ridge of the tubular inner shell, and a lower seal disposed between the inner side surface of the tubular outer housing and the lower annular ridge of the tubular inner shell.

In certain embodiments, the apparatus may be further comprised of a source of liquid disinfectant in fluid communication with the inlet port extending through the side wall of the tubular outer housing. In such embodiments, the liquid disinfectant delivery device may be operable to cause liquid disinfectant flow as liquid jets out of the plurality of orifices, each of the liquid jets directed downwardly with respect to the treatment cavity plane, and at the oblique angle with respect to the central axis of the treatment cavity. The liquid disinfectant delivery device may be operable to cause liquid disinfectant flow as liquid jets out of the plurality of orifices and form a liquid vortex surrounding the central axis of the tubular inner shell. The apparatus may be further comprised of a gas source in fluid communication with the inlet port.

In accordance with the present disclosure, a method of treating teats protruding from a mammalian udder is provided. The method comprises contacting a teat treatment device with a portion of the udder surrounding a teat so as to enclose the teat within a treatment cavity of the treatment device; and delivering a liquid into the treatment cavity of the treatment device through a plurality of orifices in a side wall surrounding the treatment cavity and onto the teat, each of the orifices directed at an oblique angle with respect to the teat and downwardly with respect to the teat. In certain embodiments, the liquid may include a disinfectant; in such embodiments, the method further comprises causing disinfection of the teat. The method may further comprise ceasing delivery of liquid into the treatment cavity, and causing delivery of a gas into the treatment cavity, and drying of liquid from a surface of the teat.

In certain embodiments, the delivering the liquid through the plurality of orifices in the side wall surrounding the treatment cavity and onto the teat causes a distal end of the teat to move in a circular path surrounding the central axis of the treatment cavity. In such embodiments, the movement of the distal end of the teat in the circular path surrounding the central axis of the treatment cavity causes let down of milk contained in the udder.

BRIEF DESCRIPTION OF THE DRAWINGS

The present disclosure will be provided with reference to the following drawings, in which like numerals refer to like elements, and in which:

FIG. 2 is an upper perspective view of a teat enclosure assembly of a teat treatment apparatus;

FIG. 3 is an exploded upper perspective view of the teat enclosure assembly;

Figure 1:
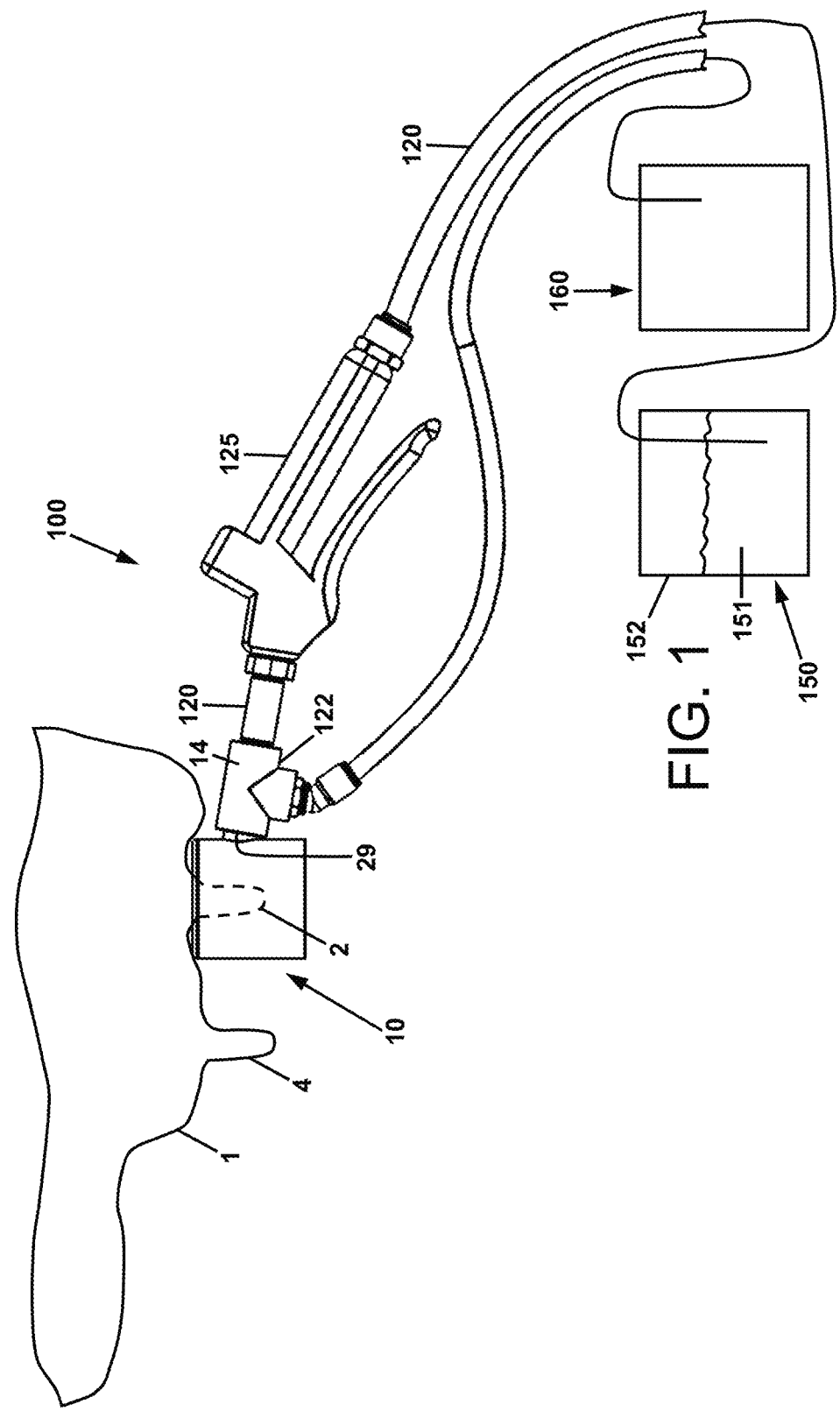
FIG. 1 is a side elevation view of one embodiment of a teat treatment apparatus of the present disclosure.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as a teat treatment apparatus and methods for use on bovines (cows). However, it is not to be construed as being limited only to use in harvesting milk from cows. The invention is adaptable to similar uses on other mammalian udders, including but not limited to those of goats, sheep, horses, and other hoofed mammals. Additionally, the description may identify certain components with the adjectives "top," "upper," "bottom," "lower," "left," "right," etc. These adjectives are provided in the context of use of the apparatus in treatment of bovine teats, and in the context of the orientation of the drawings. The description is not to be construed as limiting the apparatus to use in the exact spatial orientation shown in the drawings. The teat treatment apparatus may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Turning now to FIG. 1, a teat treatment apparatus is depicted in use on a bovine udder. For the sake of simplicity of illustration, only the udder 1, with two teats 2 and 4 are depicted. The legs, body, and other parts of the bovine are not shown. The treatment apparatus 100 is comprised of a teat enclosure assembly 10. In using the apparatus 100, the teat enclosure assembly 10 is contacted with the udder 1 such that a teat 2 is contained within a teat treatment cavity of the enclosure 10. The treatment apparatus 100 is further comprised of a first conduit 120, which is connected to a fluid inlet fitting 29 on the enclosure assembly 10. The first conduit 120 is in fluid communication with a liquid source 150, shown schematically in FIG. 1. The liquid source 150 may include a liquid delivery device such as a pump (not shown) or components (not shown) to pressurize a liquid vessel 152. The liquid delivery device is operable to deliver liquid to the teat enclosure assembly 10, as will be described subsequently. In embodiments in which the apparatus 100 is operated manually by a dairy worker, the apparatus 100 may include a hand operated valve 125, which starts, stops, and/or throttles the flow of liquid through conduit 120 and into the teat enclosure assembly 10.

The apparatus 100 may include a second conduit 130, which is in fluid communication with the teat enclosure assembly 10 and with a gas source 160. In the embodiment shown in FIG. 1, the second conduit 130 is connected to the first conduit 120 at a fitting 122 proximate to the teat enclosure assembly. Other conduit arrangements are contemplated. In an alternative embodiment, the second conduit 130 may be connected to the teat enclosure assembly 10 through additional ports in valve 125. Alternatively, the second conduit 130 may be connected to the teat enclosure assembly 10 through a second hand operated valve (not shown). In alternative embodiments (not shown) in which the liquid and gas delivery operation of the apparatus 100 is automated, the delivery of liquid and gas to the teat enclosure assembly 10 is controlled by valves that may be electrically or pneumatically actuated, and operated by output signals from a programmable logic controller.

The teat enclosure assembly 10 of the apparatus enables the dual capability of performing teat sanitization and stimulating milk letdown in a single operation. Such assembly 10 will now be described in detail with reference to FIGS. 2-9C.

The teat treatment enclosure assembly 10 is comprises a tubular outer housing 20 containing a tubular inner shell 60. The tubular outer housing 20 is comprised of a side wall 22 bounded by top and bottom edges 21 and 23, an outer side surface 24, and an opposed inner side surface 26. The tubular inner shell 60 is comprised of a side wall 62 defining a treatment cavity 61 having an open top 63 for receiving a teat 2 of an udder 1, an open bottom 65, and a central axis 99 extending through the open top 63 and open bottom 65.

The side wall 62 of the inner shell 60 is bounded by an upper edge 64 defining the open top 63 and a treatment cavity plane orthogonal to the central axis 99, a lower edge 66 defining the open bottom 65, an inner side surface 68, and an opposed outer side surface 70. The side wall 62 of the inner shell 60 includes an upper annular ridge 72 contiguous with the inner side surface 26 of the side wall 22 of the tubular outer housing 20 proximate to the top edge 21, a recessed central outer side surface 74 contiguous with a central side wall portion 75 of the tubular inner shell 60, and a lower annular ridge 76 contiguous with the inner side surface 26 of the side wall 22 of the tubular outer housing 20 proximate to the bottom edge 23.

An inlet port 27 extends through the side wall 22 of the tubular outer housing 20 and is in fluid communication with an annular cavity 78 formed by the inner side surface 26 of the tubular housing 20 and the upper annular ridge 72, recessed central side surface 74, and lower annular ridge 76 of the side wall 62 of the tubular inner shell 60. In the embodiment depicted in FIGS. 1-9C, the tubular outer housing 20 may include a tube or NPT pipe fitting 29 that is joined to the side wall 22, and is in fluid communication with the inlet port 27. This fitting 29 facilitates connection to a mating fitting 14 and liquid supply conduit 120 (FIG. 1). The fitting 29 may have a slight downward pitch relative to the central axis 99 as shown in FIG. 5. In other embodiments (not shown), the fitting 29 may be aligned perpendicular to the central axis 99. The orientation of the fitting 29 may depend upon the preference of the dairy worker, and/or the particular milking setup, i.e. the vertical location of the cow relative to the dairy worker. (In many milking operations, the dairy worker stands upon a floor that is lower than the floor the cow stands upon.)

In certain embodiments (not shown), the inner shell 60 may be fitted in and joined to the tubular housing 20 by an interference fit, in order to provide sealing between the upper and lower annular ridges 72 and 74, and the inner side surface 26 of the side wall 22 of the tubular housing. In other embodiments (not shown), welding or adhesive may be used to join and seal the two pieces 20 and 60. In the embodiment shown in FIGS. 1-9C, the upper and lower annular ridges 72 and 76 are provided with O-ring grooves, within which are fitted O-ring seals 71 and 73, respectively. In other embodiments, the tubular housing 20 and the inner shell 60 may be made of a single molded piece.

A plurality of orifices is provided in the central side wall portion 75 of the tubular inner shell 60. Each of the orifices is in fluid communication with the annular cavity 78 and the teat treatment cavity 61, and each of the orifices defines an orifice axis directed at an oblique angle with respect to the central axis 99 of the treatment cavity 61 and downwardly with respect to the treatment cavity plane. This is best understood by reference to FIGS. 2, 3, 6A, 6B, and 7A-8B. Referring first to FIGS. 2-3, it can be seen that the plurality of orifices 80 are provided, which provide fluid communication from the annular cavity 78 to the teat treatment cavity 61.

Figure 5:
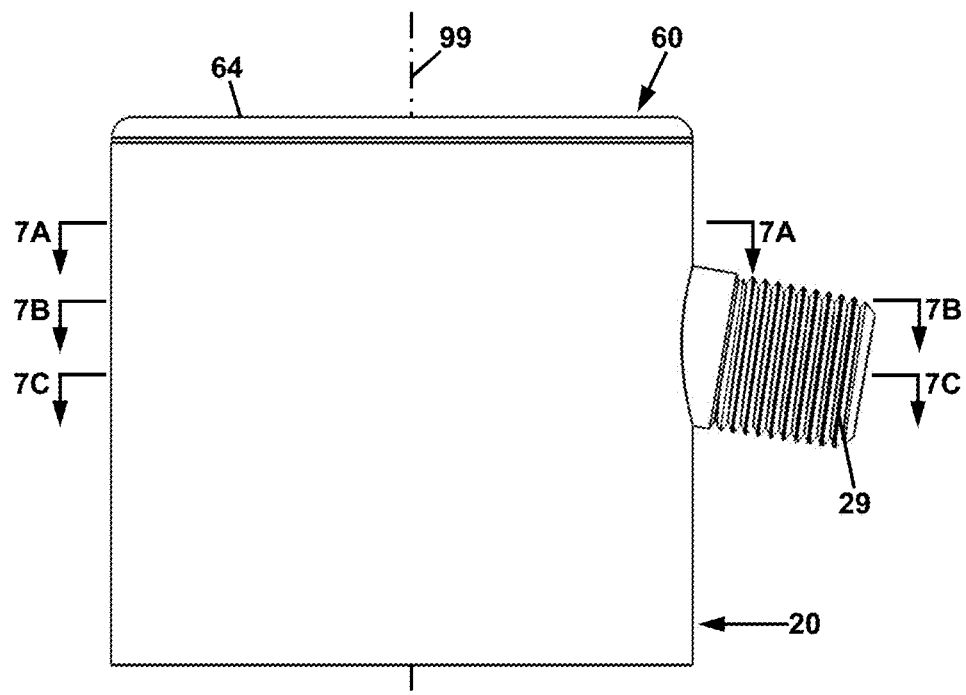
FIG. 5 is a side elevation view of the teat enclosure assembly taken along line 5-5 of FIG. 4.
Figure 6A:
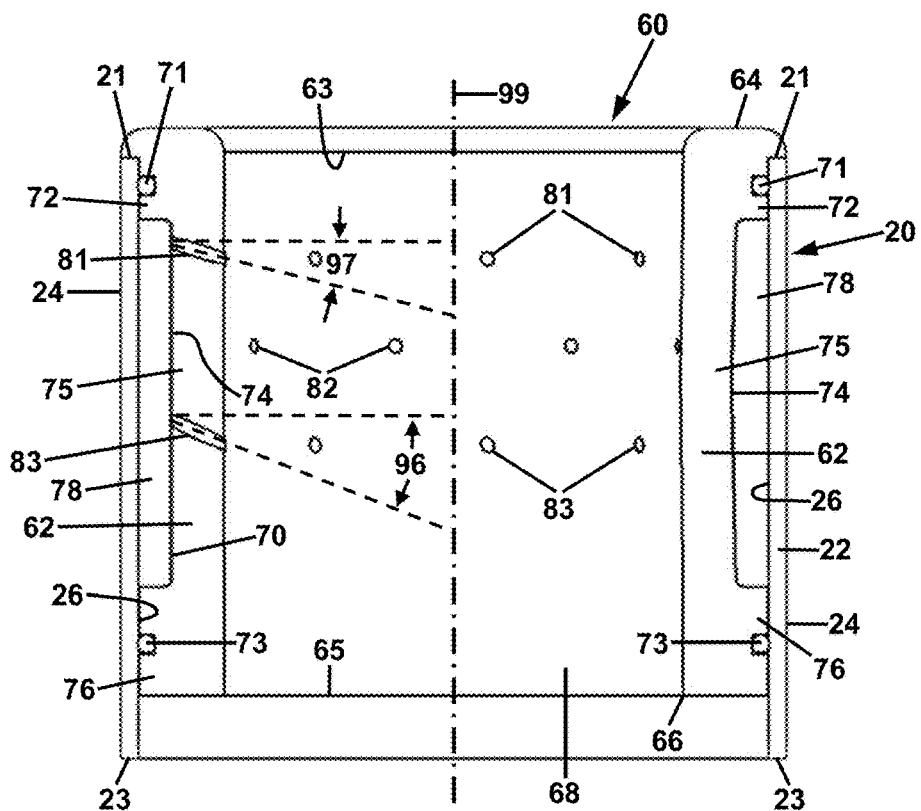
FIG. 6A is a first side cross-sectional view of the teat enclosure assembly taken along line 6A-6A of FIG. 4.
Figure 6B:
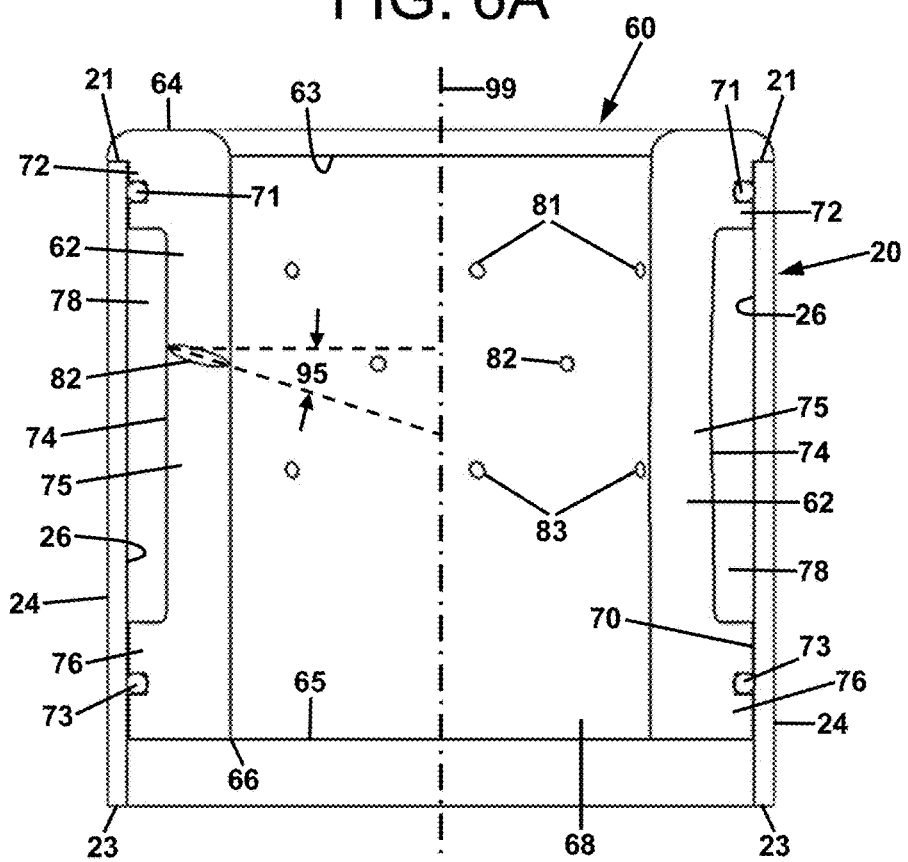
FIG. 6B is a second side cross-sectional view of the teat enclosure assembly taken along line 6B-6B of FIG. 4.
Figure 7A:
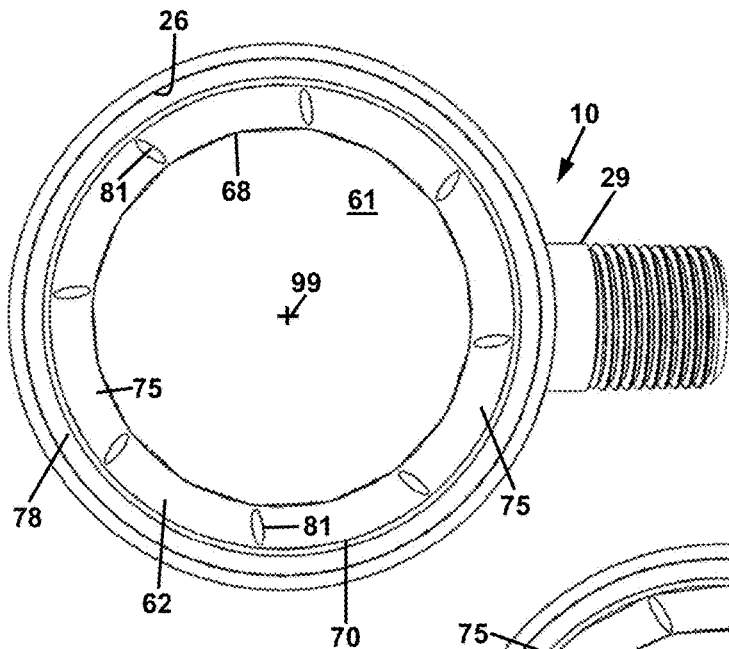
FIG. 7A is a first top cross-sectional view of the teat enclosure assembly taken along line 7A-7A of FIG. 5.
Figure 7B:
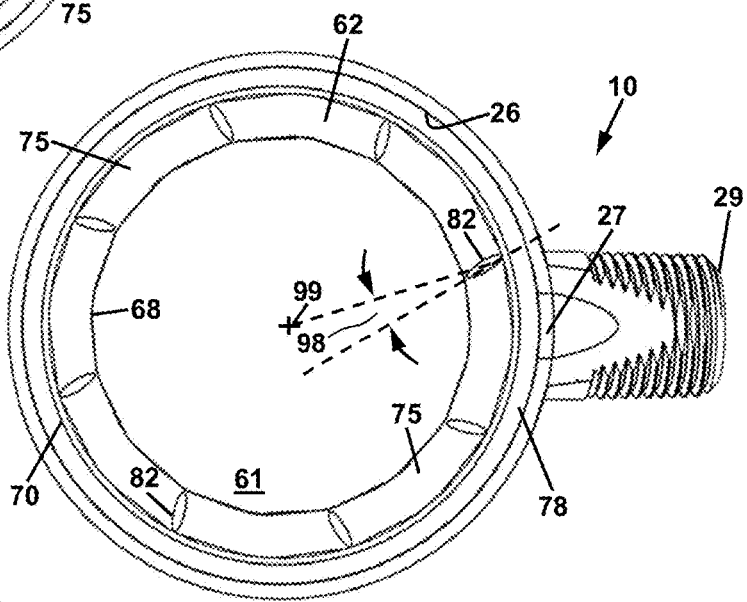
FIG. 7B is a second top cross-sectional view of the teat enclosure assembly taken along line 7B-7B of FIG. 5.
Figure 7C:
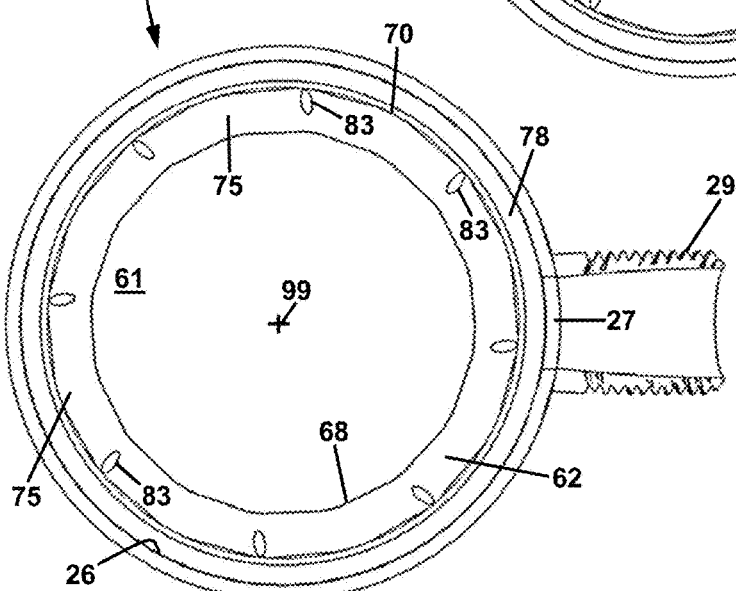
FIG. 7C is a third top cross-sectional view of the teat enclosure assembly taken along line 7C-7C of FIG. 5.

Referring to FIGS. 6A-6B and 7A-7C, the orifices may be arranged in distinct rows, e.g. a top row of orifices 81, a middle row of orifices 82, and a bottom row of orifices 83. Regardless of the presence or absence of any arrangement of orifices in rows, each of the orifices are oriented along an orifice axis directed at an oblique angle with respect to the central axis 99 of the treatment cavity 61 and downwardly with respect to the treatment cavity plane. FIG. 7A is top cross-sectional view of the teat enclosure assembly 10 taken along line 7A-7A of FIG. 5, such that the cross-sectioning plane bisects the orifices 81 of the first row. It can be seen that the orifices 81 are oriented along an orifice axis directed at an oblique angle with respect to the central axis 99 of the treatment cavity 61. In like manner FIG. 7B is top cross-sectional view of the teat enclosure assembly 10 taken along line 7B-7B of FIG. 5, such that the cross-sectioning plane bisects the orifices 82 of the second row. These orifices 82 are also oriented along an orifice axis directed at an oblique angle with respect to the central axis 99 of the treatment cavity 61. And in like manner, FIG. 7C is top cross-sectional view of the teat enclosure assembly 10 taken along line 7C-7C of FIG. 5, such that the cross-sectioning plane bisects the orifices 83 of the third row. These orifices 83 are also oriented along an orifice axis directed at an oblique angle with respect to the central axis 99 of the treatment cavity 61. (It is noted that the orifices 81, 82, and 83 appear as ellipses in respective FIGS. 7A, 7B, and 7C because they are also oriented downwardly with respect to the treatment cavity plane. Each ellipse is thus an oblong cross section of that respective orifice.)

Figure 8A:
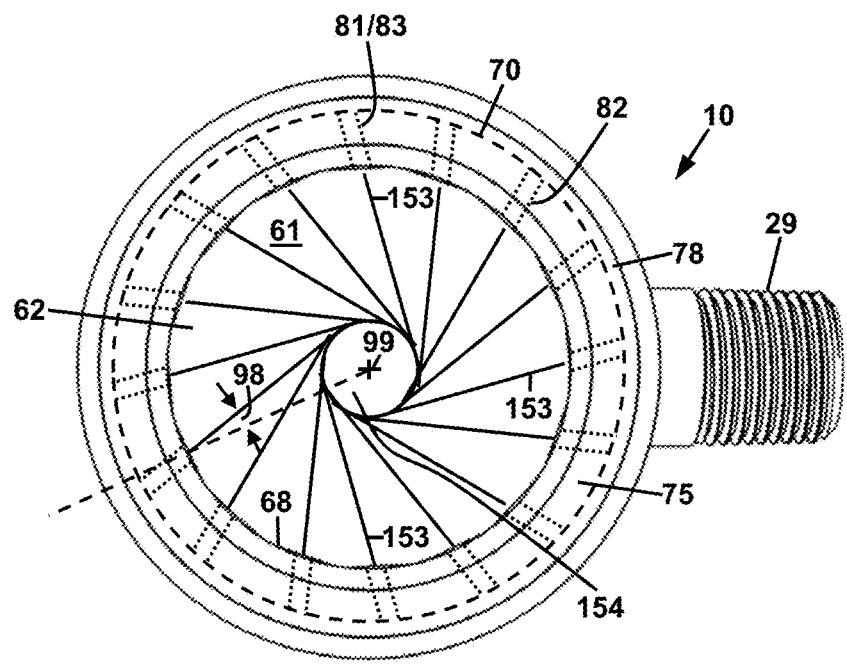
FIG. 8A is a top plan view of the teat enclosure assembly similar to the view of FIG. 4, but depicting the injection of liquid into a teat treatment cavity within the teat enclosure assembly.
Figure 8B:
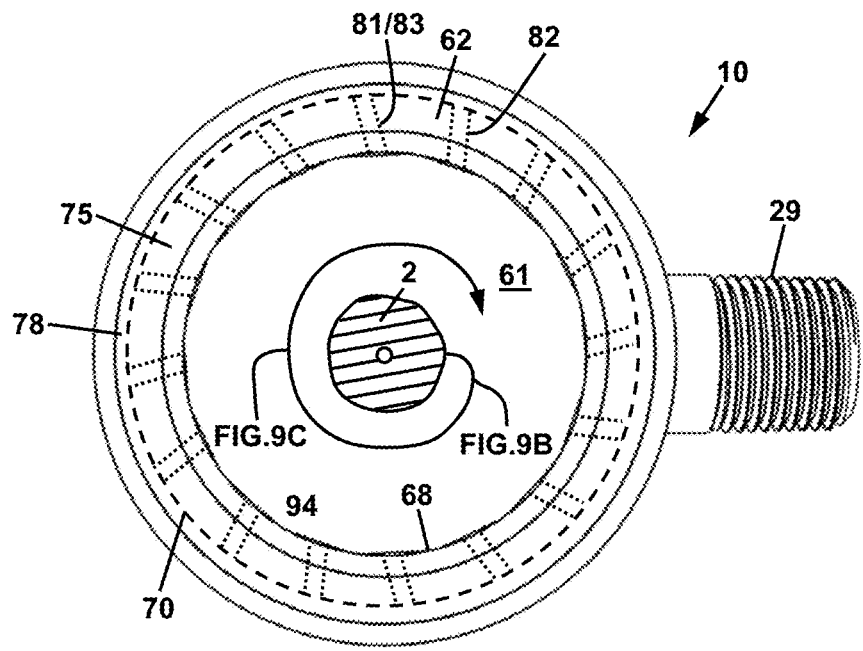
FIG. 8B is a top plan view of the teat enclosure assembly similar to the view of FIG. 8A, but depicting the rotational motion of the distal end of a teat in the teat treatment cavity within the teat enclosure assembly.

In FIGS. 8A and 8B, all of the orifices 81, 82, and 83 are shown in dotted line format. In the embodiment depicted in FIGS. 7A-8B, the orifices are oriented along an orifice axis at an oblique angle 98 of about 15 degrees. In other embodiments (not shown), the orifices may be oriented along an orifice axis at an oblique angle 98 of between about 5 degrees and about 45 degrees, with the particular angle dependent upon the size and shape of the animal's teats and the diameter of the treatment cavity.

Figure 4:
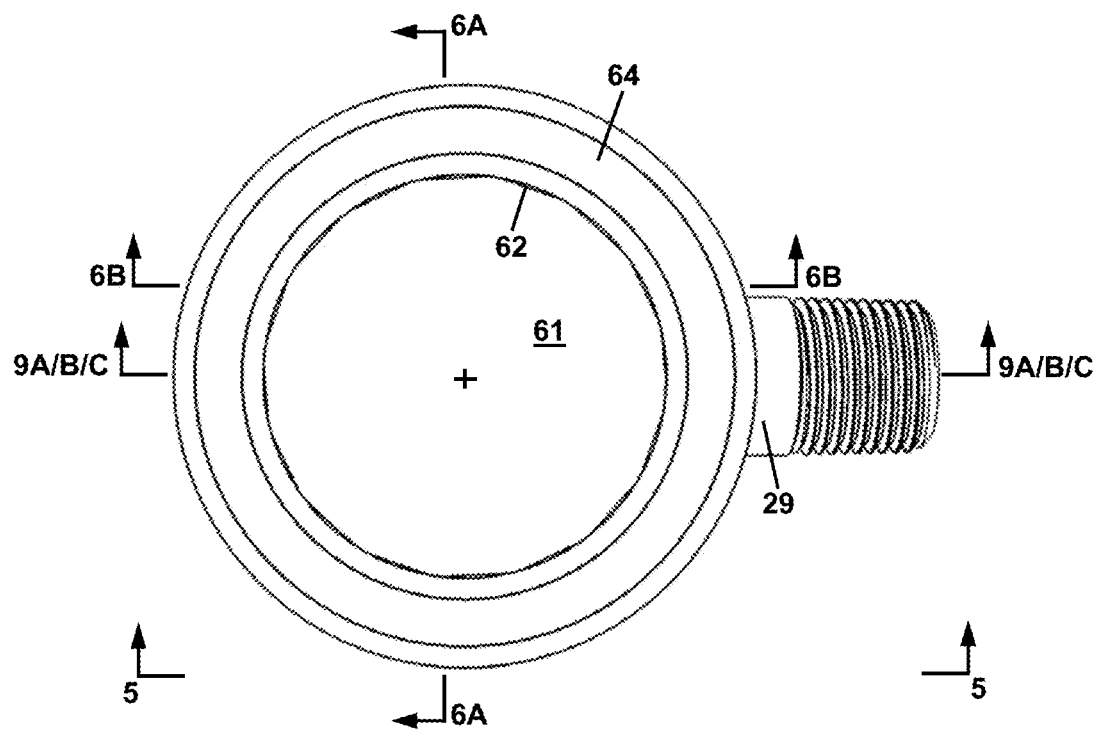
FIG. 4 is a top plan view of the teat enclosure assembly taken along line 4-4 of FIG. 2.

FIG. 6A is a first side cross-sectional view of the teat enclosure assembly 10 taken along line 6A-6A of FIG. 4. FIG. 6A is taken at a plane so as to bisect an orifice 81 of the upper row of orifices, and so as to bisect an orifice 83 of the lower row of orifices. In the embodiment depicted in FIG. 6A, it can be seen that the orifices 81 are oriented along an orifice axis at a downward angle 97 of about 16 to 18 degrees, and that the orifices 83 are oriented along an orifice axis at a downward angle 97 of about 25 degrees. In like manner, FIG. 6B is taken at a plane so as to bisect an orifice 82 of the middle row of orifices. In the embodiment depicted in FIG. 6B, it can be seen that the orifices 82 are oriented along an orifice axis at a downward angle 95 of about 16 to 18 degrees. In other embodiments (not shown), the orifices may be oriented along an orifice axis at downward angles of between about 10 degrees and about 50 degrees, with the particular angle dependent upon the size and shape of the animal's teats and the diameter of the treatment cavity. For simplicity of fabrication, the orifices are preferably circular in cross section so that they are formable by drilling. However, other cross sectional shapes may be used.

In certain embodiments, the tubular outer housing 20 may be a cylindrical housing and the tubular inner shell 60 may be a cylindrical shell surrounding the central axis 99 of the treatment cavity 61. This cylindrical geometry provides symmetry with respect to the animal's teat contained therein, and also facilitates fabrication and assembly of the teat enclosure assembly 10.

Referring again to FIG. 1, in certain embodiments, the apparatus 100 may be further comprised of a source 150 of liquid disinfectant 151 in fluid communication with the inlet port 27 in the side wall 22 of the tubular outer housing 20. In such embodiments, a liquid disinfectant delivery device, such as a pump, and/or pressure vessel, or other suitable delivery means (not shown), is operable to cause liquid disinfectant flow through the conduit 120, fittings 14 and 29, through the inlet port 27, through the annulus 78, and through the orifices 81, 82, and 83. Referring to FIGS. 8A, the disinfectant liquid emerges from the orifices as liquid jets 153, which impinge upon the teat 2 that is being treated in the teat enclosure assembly 10. It is noted that for the sake of simplicity of illustration, the liquid jets 153 in FIG. 8A are simply depicted as rays. However, the jets emerge from the orifices 81, 82, and 83 as narrow columns of liquid that begin to diverge as they move towards the teat 2.

The jets 153 are ejected with sufficient fluid velocity so as to have sufficient liquid shearing action on the teat 2, thereby dislodging any accumulated dirt and/or manure, while not irritating the teat 2. An effective liquid jet velocity may be between 10 and 50 feet per second, and preferably between 20 and 35 feet per second. When pressurized air is also delivered through the orifices, the air mixes with the liquid, forming a two phase jet. The effective jet velocity of the air alone may be between 30 and 150 feet per second, and preferably between 60 and 120 feet per second. Thus the combined two phase jet flow velocity may be between about 40 and 200 feet per second. Such jet velocities may be obtained from orifices having diameters of between 0.02 and 0.10 inches in diameter, and preferably between 0.03 and 0.07 inches in diameter. The disinfectant material in the disinfectant liquid completes the teat cleaning task by killing any pathogens on the surface of the teat 2 that will be enclosed subsequently in a milking machine cup, thereby preventing bacteria from contaminating the milk, or infecting the teat 2 and causing mastitis. Suitable disinfectant materials include, but are not limited to, ozonated water (i.e., ozone gas dissolved in water), iodine, chlorine dioxide, hydrogen peroxide, or sodium hypochlorite solutions.

By configuring the orifices 81, 82, and 83 in the tubular inner shell 60 such that the liquid jets 153 are directed at a downward angle 95/96/97 with respect to the treatment cavity plane and the teat 2 contained in the teat treatment cavity 61, and at the oblique angle 98 with respect to the central axis of the treatment cavity and the teat 2 contained in the teat treatment cavity 61, a jet vortex 154 surrounding the central axis 99 of the tubular inner shell 60 is formed within the teat treatment cavity 61 during the treatment of the teat 2. In the embodiment depicted herein, the jet vortex is formed in the upper portion of the teat treatment cavity, because the plurality of orifices 81/82/83 are provided in an upper region of the central side wall portion 75 of the tubular inner shell 60, with a lower region of the central side wall portion 75 being a continuous side wall region. Additionally, by providing the teat treatment cavity with 61 with an open bottom 65, downward liquid flow off of the teat 2 and discharge of the liquid from the open bottom 65 occurs immediately.

Figure 9A:
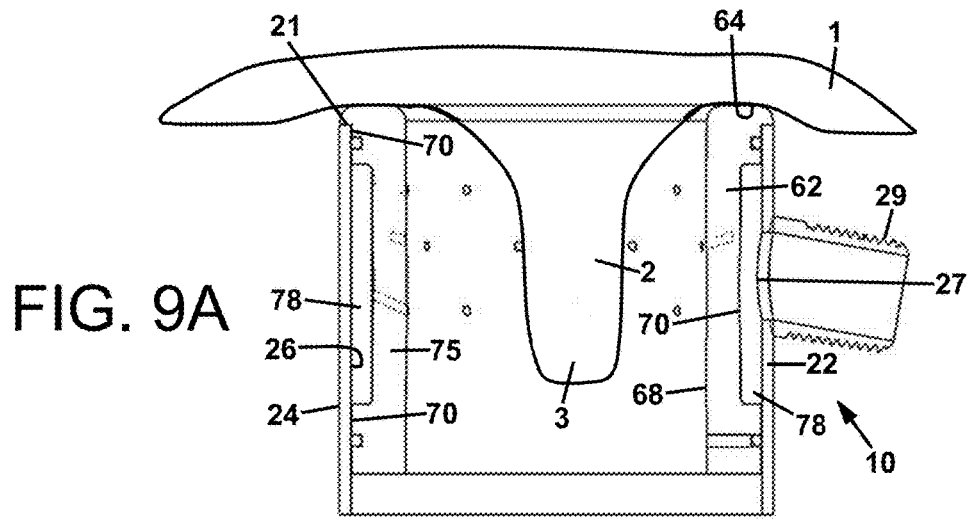
FIG. 9A-9C are side cross-sectional views of the teat enclosure assembly taken along line 9A/B/C-9A/B/C of FIG. 4, depicting the rotational motion of the distal end of a teat in the teat treatment cavity within the teat enclosure assembly.
Figure 9B:
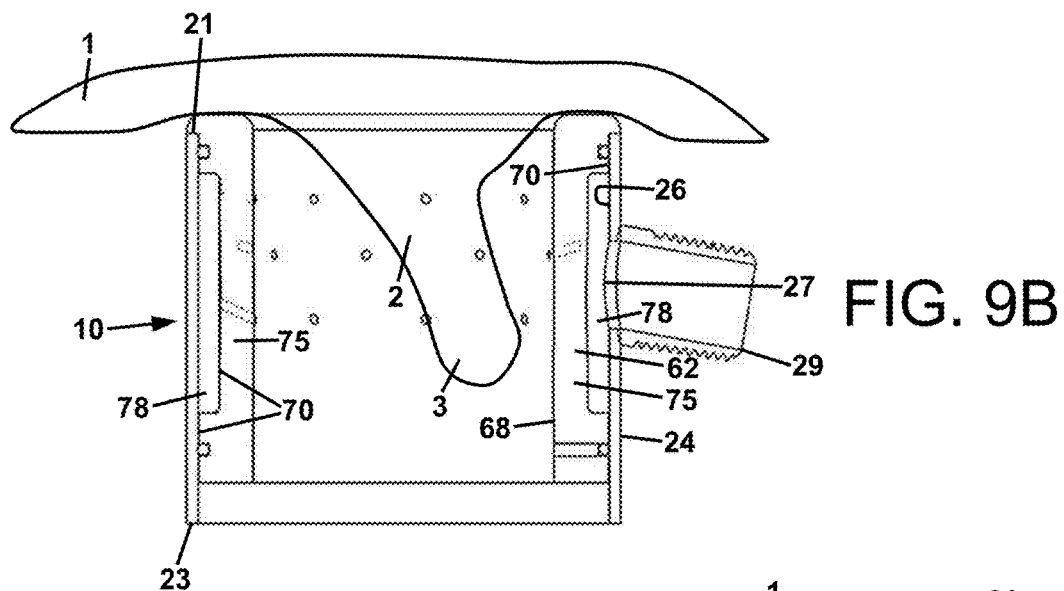
Figure 9C:
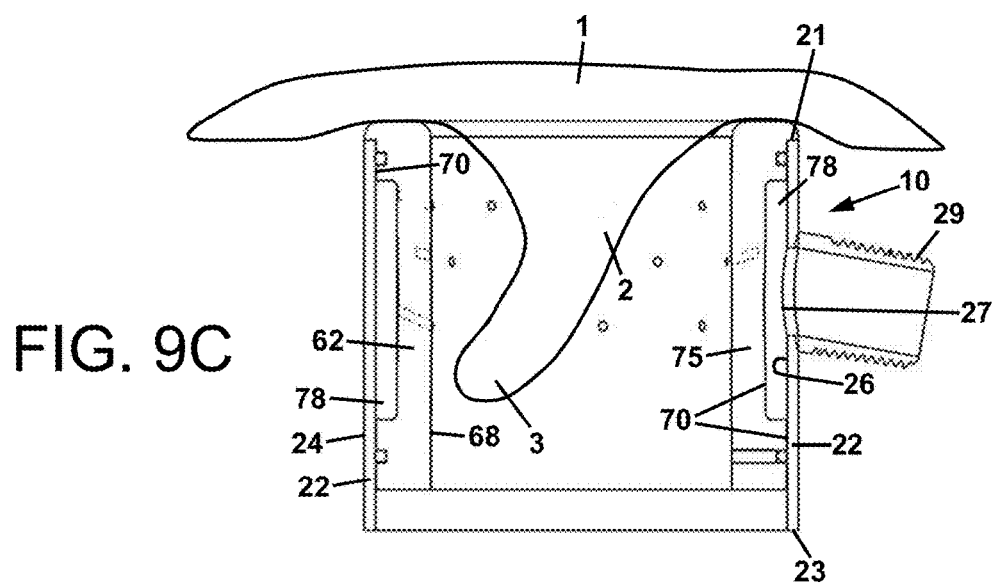

When fabricating a prototype apparatus 10 with this orifice configuration, it was expected that such a jet arrangement would hold the teat 2 in a centered position in the teat treatment cavity 61 during operation of the apparatus 10. Instead, it has been observed that surprisingly, the arrangement of the jets in this manner induces rotary motion of the distal end of the teat in the teat treatment cavity 61 during operation of the apparatus 10. This is depicted in FIGS. 8B, and 9A-9C. FIG. 8B depicts the overall circular trajectory 94 of the distal end 3 of the teat 2 from a starting point in the center of the treatment cavity 61, through nearly 360 degrees of rotation. FIG. 9A depicts the teat at the starting point in the center of the treatment cavity 61. FIG. 9B depicts the teat 2 at a first rotational position, and FIG. 9C depicts the teat 2 at a second rotational position 180 degrees opposite the first position (also as indicted in FIG. 8B).

It has been further observed that the rotational motion of the teat 2 in the teat treatment cavity 61 during the washing and disinfecting of the teat also stimulates milk let down in the udder. This observation is quite unexpected, because prior to this discovery, the conventional manner to stimulate milk let down was for the dairy worker to hand-massage the teats as described previously.

Thus the teat treatment apparatus 10 has been found to have the dual advantages of washing and disinfecting a teat 2, while simultaneously stimulating milk let down from the udder into the teat 2. Referring again to FIG. 1, the teat treatment apparatus 10 may be further comprised of a gas source 160 in fluid communication with the inlet port 27 of the tubular outer housing 20, and thus with the teat treatment cavity 61. The gas source 160 is preferably a compressed air source. In operation of the apparatus 100 to treat a teat 2, the teat 2 is first washed and disinfected with the disinfectant liquid as described previously. Then liquid flow is ceased, and air flow into the teat treatment cavity 61 is provided. This air flow functions to dry the teat 2 very quickly. In certain embodiments, both air and liquid may be injected into the teat treatment cavity 61 during the liquid disinfecting cycle, followed by a flow of drying air exclusively. Thus the teat treatment apparatus 10 washes and disinfects the teat 2, stimulates milk let down, and dries the teat 2 in a single rapid operation.

In summary of the operation of the teat treatment apparatus 100, and in accordance with the present disclosure, a method of treating teats 2 protruding from a mammalian udder 1 is provided. The method comprises contacting a teat treatment device 10 with a portion of the udder surrounding a teat 2 so as to enclose the teat 2 within a treatment cavity 61 of the treatment device 10; and delivering a liquid into the treatment cavity 61 of the treatment device 10 through a plurality of orifices in a side wall surrounding the treatment cavity and onto the teat 2, each of the orifices directed at an oblique angle with respect to the teat and downwardly with respect to the teat. In certain embodiments, the liquid may include a disinfectant. In such embodiments, the method further comprises causing disinfection of the teat. The method may further comprise ceasing delivery of liquid into the treatment cavity, and causing delivery of a gas into the treatment cavity, and drying of liquid from a surface of the teat.

In certain embodiments, the delivering the liquid through the plurality of orifices in the side wall surrounding the treatment cavity and onto the teat 2 causes a distal end of the teat 2 to move in a circular path surrounding the central axis of the treatment cavity. In such embodiments, the movement of the distal end of the teat 2 in the circular path surrounding the central axis of the treatment cavity causes let down of milk contained in the udder 1.

EXAMPLE

A series of prototype teat treatment apparatus were fabricated and tested. Through experimentation, certain apparatus that were effective in teat cleaning and disinfecting, and that also had the unexpected milk let down stimulation capability, were discovered.

One exemplary apparatus that had these capabilities was fabricated as follows. The tubular outer housing of the teat treatment enclosure assembly was fabricated from stainless steel tubing, and had a ⅜ inch pipe nipple welded to it at the inlet port to enable liquid and compressed air delivery into the outer housing. The tubular inner shell was fabricated from polyvinyl chloride plastic. The plastic piece was machined at the ends to form annular ridges with grooves for O-ring seals, and to have a recess that formed an annulus in fluid communication with the inlet port. The teat treatment cavity in the tubular inner shell had a diameter of 1.74 inches and a height of 2.13 inches.

Orifices of 0.05 inches in diameter were drilled in the upper central side wall portion of the tubular inner shell. A top row of 8 orifices spaced at intervals of 45 degrees were drilled with a downward angle of 17 degrees, and an oblique angle of 13.6 degrees with respect to the central axis of the treatment cavity. A middle row of 8 orifices spaced at intervals of 45 degrees were drilled with a downward angle of 15 degrees, and an oblique angle of 13.6 degrees with respect to the central axis of the treatment cavity. A bottom row of 8 orifices spaced at intervals of 45 degrees were drilled with a downward angle of 25 degrees, and an oblique angle of 13.6 degrees.

In fabricating the prototypes, it was discovered that by angling the orifices downwardly and obliquely, a jet vortex 154 (FIG. 8A) was created in the teat treatment cavity. In the prototype embodiment fabricated as described above, the jet vortex 154 was about 0.50 inches in diameter. It was observed that when an operator inserted his finger into top opening of the treatment cavity and into the vortex, his fingertip would be driven in circular motion. The same effect was observed when releasing a small piece of rag into the vortex. By careful observation and feeling upwardly into the teat treatment chamber during operation on a cow, it could be confirmed that the tip of the teat was moving in rapid circular motion.

Without wishing to be bound to any particular theory, the Applicants believe that the downward and oblique direction of the orifices, the resulting size of the vortex "eye," and the open bottom of the teat treatment cavity that enables rapid draining of liquid appear to be factors that makes the teat treatment enclosure assembly function well in cleaning/disinfecting and milk letdown stimulation. It was further observed using an earlier prototype that when the orifice oblique angle was relatively low, less that about 10 degrees, resulting in a small vortex, excessive disinfectant liquid would splash out of the top of the treatment cavity. By angling the orifices obliquely and downwardly, liquid momentum is produced, which results in rapid discharge of the liquid out the bottom of the treatment cavity. The Applicants further believe that by not having excess liquid accumulate in the treatment cavity, the rapid circular motion of the end of the teat is enabled.

It is noted that the dimensions and orifice angles recited above for the prototype are to be considered exemplary and not limiting. Other dimensions and angles are contemplated, depending upon the size and shape of the particular mammal's teats.

Experimental trials were conducted using the prototype apparatus. In certain trials, a cow's teats were prepared for milking (washed/disinfected, stimulated, and dried) with the apparatus by applying the apparatus for about 2 second per teat. The operation applied approximately two quarts of water ozonated at 2 parts per million per cow (i.e., per four teats). In certain trials, liquid disinfectant was provided at a flow rate that resulted in a liquid jet velocity of about 27 feet per second . Air flow was also added during liquid disinfectant flow; and after cut off of liquid flow, for teat drying. In certain trials, the air flow was provided at a flow rate of 125 standard cubic feet per hour, resulting in an air jet velocity of about 106 feet per second.

Over the course of the experimental trials, bacteria count, somatic cell count, and the effectiveness of milk letdown stimulation was measured. Flow meters were installed on the milking machines, so that the flow rate of milk from a cow during milking could be continuously measured. Milk flow rate data was acquired and analyzed using Dairy Plan software from GEA Group Aktiengesellchaft of Dusseldorf, Germany. Thus the stimulation effectiveness of the apparatus could be determined by measuring a cow's milk letdown flow rate. A cow that lets some milk down at a high flow rate, then lets milk down at a low flow rate, and then lets milk down again at a high flow rate is said to have a "bimodal milk curve," which is undesirable. Across the entire dairy herd of about 500 milking cows, the goal was to have less than 10 percent of the cows exhibiting a bimodal milk curve.

Prior to use of the prototype apparatus, the 25% of herd had a bimodal milk curve. It was observed that by spending about a minimum of 6 seconds, and preferably about 10 seconds, of preparation time on a cow using the prototype washing and stimulation apparatus, less than 10% of the herd exhibited a bimodal milk curve, with the best result being about 6%. It was further observed that if the use of the apparatus was too fast, i.e. less than about 6 seconds, the device was less effective, resulting in about 15% of the herd exhibiting a bimodal milk curve.

With regard to sanitation, in certain experimental trails, ozonated water was used as a disinfectant liquid, with a concentration of dissolved ozone gas in the water of 2 parts per million. In other trials conducted to date, disinfectant with 3 ppm $O_3$ concentration has been used. Bacterial count testing was performed with a Hygiena SystemSURE Plus™ ATP Luminometer manufactured by the Hygenia Corporation of Camarillo, Calif., using UltraSnap™ (ATP Swab). Swabs were taken at multiple points through the milking process to help determine cleanliness by measuring levels of adenosine triphosphate (ATP) on the surfaces of the cow's teats and/or on the surface of the apparatus. (Detection of ATP on a surface indicates the presence of microbial (bacterial) contamination or residues that may support microbe growth.) The instrument provided data in Relative Light Units (RLU), which are directly proportional to the presence of ATP, and thus indicative of the presence of bacteria or residues that may serve as culture media. In the experimental trials, low readings of RLU were consistently obtained, indicating the effectiveness of the apparatus in disinfecting a cow's teats.

It is further noted that the duration and flow rates of liquid disinfectant and air to the washing and stimulation apparatus is straightforward to control with a programmable logic controller, whether the apparatus is operated robotically or manually by a dairy worker. Thus consistent favorable sanitation and stimulation results can be achieved with the apparatus.

In addition to providing teat washing, disinfecting, let down stimulation, and drying using a single apparatus and step, the Applicants' apparatus and method have numerous additional advantages over conventional treatment apparatus and methods, including the following:

- The apparatus is simple, with no moving parts that require maintenance or periodic replacement. Additionally, by having no moving parts that contact the teats, the teats are not damaged.
- The apparatus is light in weight, thus enabling manual operation by a dairy worker without repetitive stress injuries.
- The milk let down stimulation capability of the apparatus is provided without conventional hand-massaging. This highly tactile human hand massaging effect would be very difficult to replicate with a robotic hand. However, robotic operation of the present apparatus to provide cleaning and stimulation would be relatively straightforward.
- The apparatus and methods are also straightforward to automate with respect to programmable control of liquid disinfectant and gas delivery.
- The apparatus may be used in an entirely manual operation, or with minimal automation, or with very advanced automation depending upon needs of user.
- The apparatus cleans or "flushes" itself with use, in contrast to other devices, where brushes, contact tools, or hands may carry bacteria to other teats.
- The apparatus is flexible to use in different protocols depending upon how much contamination is on cows teats, which may vary based on bedding type, weather or cleanliness of the barn/milking facility.
- The amount of liquid or sanitizer dispensed by the apparatus may be varied depending on the particular cow and/or farm's or herd's needs.
- The apparatus may be operated to provide individual functions such as stimulate/wash, or just dry, if needed in environments such as a rotary milking parlor where cow milking preparation happens at one or more stations.

It is therefore apparent that there has been provided, in accordance with the present disclosure, an apparatus and method for treatment of teats of a mammalian udder. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As used herein, the words "comprise," "include," "contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, the Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

We claim:

1. A teat treatment apparatus comprising:
   a) a tubular outer housing comprising a side wall bounded by top and bottom edges, an outer side surface, and an opposed inner side surface;
   b) a tubular inner shell comprising a side wall defining a treatment cavity having an open top for receiving a teat of an udder and terminating at an open bottom, the tubular inner shell being absent of any fluid transporting structure beneath the open bottom; the side wall of the tubular inner shell bounded by an upper edge defining the open top and a treatment cavity plane orthogonal to a central axis of the treatment cavity, a lower edge defining the open bottom, an inner side surface, and an opposed outer side surface;
   c) an inlet port extending through the side wall of the tubular outer housing and in fluid communication with an annular cavity formed between the outer side surface of the side wall of the tubular inner shell and the inner side surface of the side wall of the tubular outer shell; and
   d) a plurality of orifices in the side wall of the tubular inner shell, the orifices in fluid communication with the annular cavity and the treatment cavity, and the orifices defining an orifice axis directed at an oblique angle with respect to the central axis of the treatment cavity and downwardly with respect to the treatment cavity plane.

2. The apparatus of claim 1, wherein the tubular outer housing is a cylindrical housing and the tubular inner shell is a cylindrical shell surrounding the central axis of the treatment cavity.

3. The apparatus of claim 1, wherein the plurality of orifices are arranged in a plurality of rows at successive planar locations parallel to the treatment cavity plane.

4. The apparatus of claim 1, wherein the plurality of orifices are provided in an upper region of the side wall of the tubular inner shell.

5. The apparatus of claim 1, further comprising a source of liquid disinfectant in fluid communication with the inlet port extending through the side wall of the tubular outer housing.

6. The apparatus of claim 5, further comprising a liquid disinfectant delivery device operable to cause liquid disinfectant flow through the inlet port, through the annular cavity, and through the plurality of orifices in the side wall of the tubular inner shell, and into the treatment cavity.

7. The apparatus of claim 6, wherein the liquid disinfectant delivery device is operable to cause liquid disinfectant flow as liquid jets out of the plurality of orifices, the liquid jets directed downwardly with respect to the treatment cavity plane, and at the oblique angle with respect to the central axis of the treatment cavity.

8. The apparatus of claim 7, wherein the liquid disinfectant delivery device is operable to cause liquid disinfectant flow as liquid jets out of the plurality of orifices and form a liquid vortex surrounding the central axis of the treatment cavity.

9. The apparatus of claim 8, wherein when a teat is disposed in the liquid vortex in the treatment cavity, the liquid jets cause a distal end of the teat to move in a circular path surrounding the central axis of the treatment cavity.

10. The apparatus of claim 1, wherein the orifices are configured such that when liquid jets are ejected from the orifices toward a teat disposed in the treatment cavity, the liquid jets cause a distal end of the teat to move in a circular path surrounding the central axis of the treatment cavity.

11. A method of treating teats protruding from a mammalian udder, the method comprising:
 a) contacting a teat treatment device with a portion of the udder surrounding a teat so as to enclose the teat within a treatment cavity of the treatment device, the treatment cavity having an open top and terminating at an open bottom and absent of any fluid transporting structure beneath the open bottom;
 b) delivering a liquid into the treatment cavity of the treatment device through a plurality of orifices in a side wall surrounding the treatment cavity and onto the teat; and
 c) discharging the liquid from the open bottom of the treatment cavity by gravity-driven flow into free space beneath the open bottom.

12. The method of claim 11, wherein the liquid includes a disinfectant, and the method further comprises causing disinfection of the teat.

13. The method of claim 11, further comprising ceasing delivery of liquid into the treatment cavity, and causing delivery of a gas into the treatment cavity, and drying of liquid from a surface of the teat.

14. The method of claim 11, further comprising ceasing delivery of liquid into the treatment cavity, and causing delivery of a gas into the treatment cavity, and drying of liquid from a surface of the teat.

15. The method of claim 11, further comprising ceasing delivery of liquid into the the treatment cavity, and causing delivery of a gas into the treatment cavity, and drying of liquid from a surface of the teat.

16. The method of claim 11, wherein the orifices are directed at an oblique angle with respect to the teat and downwardly with respect to the teat.

17. The method of claim 16, further comprising causing a distal end of the teat to move in a circular path surrounding a central axis of the treatment cavity.

18. The method of claim 17, further comprising causing let down of milk contained in the udder.

19. A teat treatment apparatus comprising:
 a) a tubular outer housing comprising a side wall bounded by top and bottom edges, an outer side surface, and an opposed inner side surface;
 b) a tubular inner shell comprising a side wall defining a treatment cavity having an open top for receiving a teat of an udder and terminating at an open bottom permitting gravity-driven liquid drainage out of the cavity, the tubular inner shell being absent of any fluid transporting structure beneath the open bottom; the side wall of the tubular inner shell bounded by an upper edge defining the open top, a lower edge defining the open bottom, an inner side surface, and an opposed outer side surface; and
 c) an inlet port extending through the side wall of the tubular outer housing and in fluid communication with an annular cavity formed between the outer side surface of the side wall of the tubular inner shell and the inner side surface of the side wall of the tubular outer shell.

20. The apparatus of claim 19, further comprising a plurality of orifices in the side wall of the tubular inner shell, the orifices in fluid communication with the annular cavity and the treatment cavity, and the orifices defining an orifice axis directed at an oblique angle with respect to a central axis of the treatment cavity and downwardly with respect to a treatment cavity plane defined by the upper edge of the tubular inner shell.

* * * * *